United States Patent
Prevoir et al.

(10) Patent No.: US 10,623,861 B2
(45) Date of Patent: Apr. 14, 2020

(54) WEARABLE DEVICES USING SHAPE MEMORY POLYMERS

(71) Applicant: Bose Corporation, Framingham, MA (US)

(72) Inventors: Shawn Prevoir, Northborough, MA (US); Kai Gao, Marlborough, MA (US)

(73) Assignee: Bose Corporation, Framingham, MA (US)

(*) Notice: Subject to any disclaimer, the term of this patent is extended or adjusted under 35 U.S.C. 154(b) by 0 days.

(21) Appl. No.: 16/119,881

(22) Filed: Aug. 31, 2018

(65) Prior Publication Data

US 2020/0077192 A1    Mar. 5, 2020

(51) Int. Cl.
*H04R 25/00* (2006.01)
*H04R 5/033* (2006.01)
*C08L 67/02* (2006.01)
*C08G 63/16* (2006.01)
*C08G 65/34* (2006.01)

(52) U.S. Cl.
CPC .......... *H04R 5/0335* (2013.01); *C08G 63/16* (2013.01); *C08G 65/34* (2013.01); *C08L 67/025* (2013.01); *C08G 2280/00* (2013.01); *C08L 2203/20* (2013.01); *H04R 2201/105* (2013.01); *H04R 2201/109* (2013.01)

(58) Field of Classification Search
CPC ............ H04R 5/0335; H04R 2201/105; H04R 2201/109; C08G 63/16; C08G 65/34; C08G 2280/00; C08G 2203/20; C08L 67/025
See application file for complete search history.

(56) References Cited

U.S. PATENT DOCUMENTS 9,571,917 B2   2/2017   Litovsky et al.
9,628,889 B2   4/2017   Kirkpatrick
(Continued)

FOREIGN PATENT DOCUMENTS

EP    2075273       7/2009
WO    2018099562    6/2018

OTHER PUBLICATIONS

Behl et al. "Shape-memory polymers." Materials Today. vol. 10, No. 4, 2007, pp. 20-28 (Year: 2007).*

(Continued)

*Primary Examiner* — Simon King
(74) *Attorney, Agent, or Firm* — Bond, Schoeneck & King, PLLC

(57) ABSTRACT

A wearable device including a body having one or more embedded electronic components, the body further including a thermoset material having a polymeric backbone with at least one urethane linkage and a glass transition temperature. At a first temperature that is lower than the glass transition temperature, the body has an original shape. When the body is heated to a second temperature that is higher than the glass transition temperature, the body is deformable from the original shape to a first shape and when the body is cooled to a third temperature that is lower than the glass transition temperature, the first shape is maintained. The body is further configured to transition from the first shape to the original shape when the body is heated from the third temperature to a fourth temperature that is higher than the glass transition temperature.

20 Claims, 7 Drawing Sheets

(56) References Cited

U.S. PATENT DOCUMENTS

| | | | |
|---|---|---|---|
| 2012/0035615 A1* | 2/2012 | Koester | A61B 17/3468 |
| | | | 606/129 |
| 2013/0161026 A1 | 6/2013 | Garza et al. | |
| 2014/0323647 A1* | 10/2014 | Voit | B29C 64/135 |
| | | | 524/548 |
| 2016/0173971 A1* | 6/2016 | Lott | H04R 1/1066 |
| | | | 381/380 |
| 2016/0317352 A1 | 11/2016 | Blumer et al. | |
| 2017/0188126 A1* | 6/2017 | Hirano | H04R 1/10 |
| 2017/0311069 A1 | 10/2017 | Prevoir et al. | |
| 2018/0167752 A1* | 6/2018 | Olsen | H04R 1/1016 |
| 2018/0178439 A1 | 6/2018 | Robert et al. | |

OTHER PUBLICATIONS

International Search Report and the Written Opinion of the International Searching Authority, International Application No. PCT/US2019/049043, dated Dec. 9, 2019, pp. 1-11.

* cited by examiner

WEARABLE DEVICES USING SHAPE MEMORY POLYMERS

BACKGROUND

This disclosure relates to wearable devices made of or partially made of thermoset shape memory polymers for improved comfort, stability and overall wearability.

Commercially available wearable devices are typically offered in standard sizes to fit a majority of consumers rather than each individual consumer. Since such wearable devices are not customized to fit each person's unique anatomical features, they are not suitable for all day comfort. While custom-fitted products are generally considered to achieve the best fit, existing methods of customization can be costly, time consuming, and/or complicated. Some customization strategies rely on using thermoplastics, such as polycaprolactone, in their softened state, which leads to cosmetic issues and temperature stability concerns. Other customization solutions rely on UV-curable silicones with a catalyst and a curative embedded in a preform. Unfortunately, these materials tend to cure even in the absence of UV. Also, these solutions provide a single non-reversible impression. If the user makes a mistake during the curing process, a new product is required. Furthermore, these customizable products are designed for a single end user. Sharing between multiple users is not possible.

Accordingly, there is a need in the art for inexpensive, fast, easy, and reversible systems and methods for customizing wearable devices that allow for repeated customization in case an initial molding is not successful or two or more different users desire to share a single customizable device.

SUMMARY

All examples and features mentioned below can be combined in any technically possible way.

In one aspect, a wearable device includes a body having one or more embedded electronic components and a thermoset material having a polymeric backbone including at least one urethane linkage and a glass transition temperature. At a first temperature that is lower than the glass transition temperature, the body has an original shape. When the body is heated to a second temperature that is higher than the glass transition temperature, the body is deformable from the original shape to a first shape and when the body is cooled to a third temperature that is lower than the glass transition temperature, the first shape is maintained. The body is configured to transition from the first shape to the original shape when the body is heated from the third temperature to a fourth temperature that is higher than the glass transition temperature.

In one example, the thermoset material includes a reaction product of a polyol component, an isocyanate component, a crosslinker, and a catalyst to polymerize the isocyanate and polyol components. In one example, the polyol component includes a multifunctional polyether and a polyether diol or a multifunctional polyester and a polyether diol. In one example, the thermoset material is potted in a soft coating to improve comfort.

In one example, the thermoset material further includes a conductive or photothermal additive and a resistive heating element configured to heat the body to the second and fourth temperatures that are above the glass transition temperature. In one example, the one or more embedded electronic components include an electrode sensor to pick up biosignals. In one example, the body is heated with a heating pad, light, or water.

In another aspect, a wearable device includes a body having one or more embedded electronic components and a thermoset material containing a reaction product of a polyol component and an isocyanate component. The thermoset material also having a glass transition temperature. At a first temperature that is lower than the glass transition temperature, the body has an original shape. When the body is heated to a second temperature that is higher than the glass transition temperature, the body is deformable from the original shape to a first shape and when the body is cooled to a third temperature that is lower than the glass transition temperature, the first shape is maintained. The body is configured to transition from the first shape to the original shape when the body is heated from the third temperature to a fourth temperature that is higher than the glass transition temperature. In one example, the polyol component consists of a multifunctional polyether.

In another aspect, the polyol component includes a multifunctional polyether and a polyether diol. In one example, the polyol component includes 50% of the polyether diol and 50% of the multifunctional polyether.

In another aspect, the polyol component includes more of the multifunctional polyether than the polyether diol.

In another aspect, the polyol component includes a multifunctional polyester and a polyether diol. In one example, the polyol component includes more of the multifunctional polyester than the polyether diol.

In one example, the thermoset material is potted in a soft coating to improve comfort. In one example, the one or more embedded electronic components include an electrode sensor to pick up biosignals. In one example, the wearable device further includes a resistive heating element configured to heat the body to the second and fourth temperatures that are above the glass transition temperature.

In another aspect, an earpiece includes an acoustic driver for transducing received audio signals to acoustic energy and a body including a thermoset material containing a reaction product of a polyol component and an isocyanate component. The thermoset material also having a glass transition temperature, wherein at a first temperature that is lower than the glass transition temperature, the body has an original shape. When the body is heated to a second temperature that is higher than the glass transition temperature, the body is deformable from the original shape to a first shape and when the body is cooled to a third temperature that is lower than the glass transition temperature, the first shape is maintained. The body is configured to transition from the first shape to the original shape when the body is heated from the third temperature to a fourth temperature that is higher than the glass transition temperature.

In one example, the earpiece is an in-ear earpiece configured to fit inside a user's ear. In another example, the earpiece is an around-the-ear earpiece configured to be positioned on a user's ear.

Providing wearable devices with thermoset shape memory polymers is advantageous over providing heat softening thermoplastic polymers because, for example, thermoset shape memory polymers do not melt and can reversibly transition between customized shapes and their original molded forms. Providing wearable devices with shape memory polymers is advantageous over shape memory alloys because, for example, shape memory polymers are less dense than shape memory alloys and allow for a much larger extent of deformation with a smaller amount of required stress for deformation. Shape memory polymers are processed under low-pressure conditions whereas shape memory alloys are processed under high-pressure conditions. Further, shape memory polymers are less expensive than shape memory alloys.

Other features and advantages will be apparent from the description and the claims.

DETAILED DESCRIPTION

The present disclosure describes various wearable devices using thermoset shape memory polymers to improve the wearability of wearable devices.

This disclosure is based, at least in part, on the realization that consumers are wearing on-body products for longer periods of time and, to provide improved overall customer satisfaction, it is desirable to improve upon elements associated with comfort (e.g., stability, form-fitting aspects, and pressure exerted on the skin/body). Various attempts have been made to improve the wearability of wearable devices. For example, conventional customization solutions involve capturing anatomical geometry (e.g., through impressions or scanning) followed by part fabrication (e.g., CAD modelling, printing molds, injecting soft material into the mold, curing, demolding, and finishing). However, such conventional solutions are not practical for most consumers due to the number of steps required. Although current in-home customization solutions have been made to decrease the number of steps required, for example, by involving heat softening thermoplastics and UV-curable silicones, such attempts suffer from material-related limitations that hinder their wide deployment and acceptance.

The embodiments and implementations disclosed or otherwise envisioned herein can be utilized with any suitable wearable device made of or partially made of a thermoset shape memory polymer, such as the ones described herein. Examples of suitable wearable devices include StayHear+® eartips from Bose Corporation of Framingham, Mass., earbuds, over-the-ear headphones, noise-blocking earplugs, hearing aids, and augmented reality glasses. However, the disclosure is not limited to these enumerated devices, and thus the disclosure and embodiments disclosed herein can encompass any wearable device.

Figure 1A:
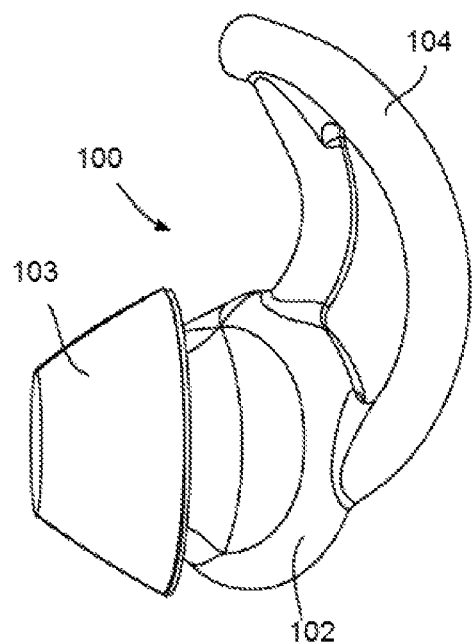
FIG. 1A shows an elevational view of an example customizable wearable device, in accordance with an embodiment.
Figure 1B:
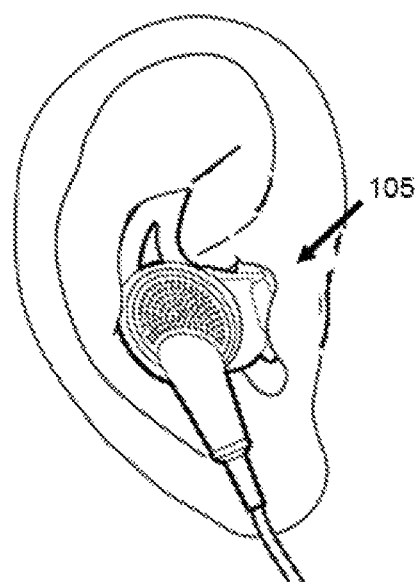
FIG. 1B shows the example customizable wearable device of FIG. 1A coupled with an earpiece and positioned in an ear, in accordance with an embodiment.

Referring to FIG. 1A, an example customizable ear tip 100 for an earphone is shown. The customizable ear tip 100 includes tip body 102, umbrella 103, and wing 104. Umbrella 103 is at the distal end of ear tip 100 (e.g., the left-most end in FIG. 1A) and configured to surround a nozzle of an earpiece and fit within a user's ear (e.g., at the entrance to the ear canal sealing the ear without entering the canal). Ear tip 100 typically includes an internal hollow passage extending from the distal end through tip body 102. The internal hollow passage communicates with a nozzle of an earpiece. The earpiece is typically positioned outside the ear to deliver sound to the ear canal of the ear. As shown in FIG. 1B, customizable ear tip 100 can be removably coupled to earpiece 105, which may include audio electronics acoustically coupled to the internal hollow passage extending within tip body 102 and umbrella 103. Earpiece 105 can include earphones, earplugs, earbuds, ear tubes, ear speakers, earcups, and the like, and the sound-emitting device can be housed in any suitable housing (e.g., an earbud, an earcup, or other housing). In example embodiments, earpiece 105 also includes one or more sensors such as a heart rate sensor. While only a single stand-alone customizable ear tip 100 is shown in FIG. 1A, customizable ear tip 100 may be one of a pair of customizable ear tips, one for each ear. Customizable ear tip 100 may be connected to another customizable ear tip, for example, by a headband, by leads that conduct audio signals, or wirelessly without a band, wire, or cord between the devices. As further described herein, since ear tip 100 is made with a suitable thermoset shape memory polymer that has already been molded into its final form, the original shapes of tip body 102, umbrella 103, and/or wing 104 can be reversibly manipulated to form shapes that have greater conformity with a user's ear when heated.

Figure 1C:
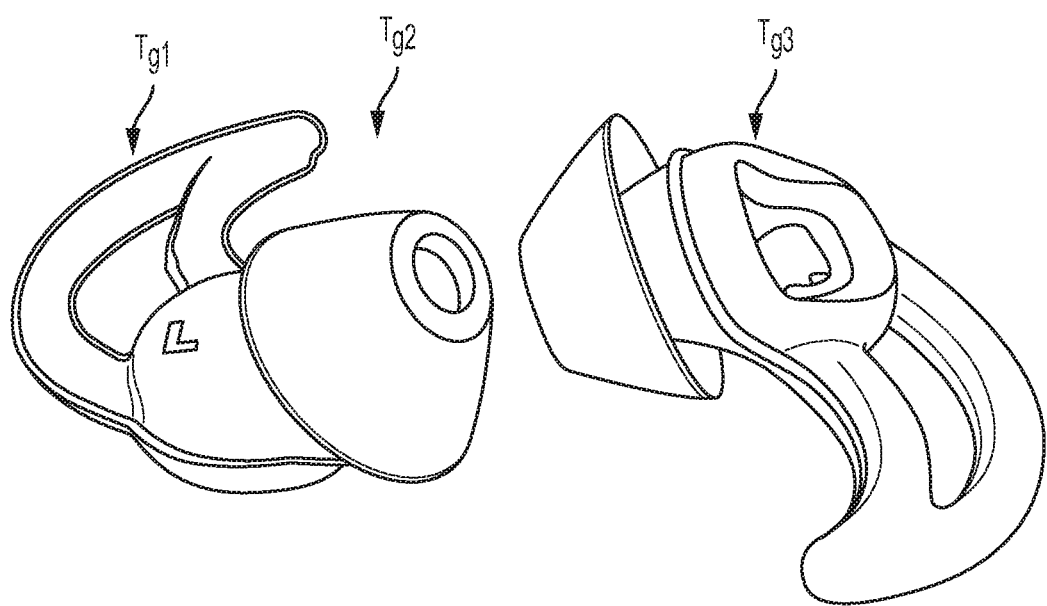
FIG. 1C shows an elevational top perspective view and an elevational bottom perspective view of the example customizable wearable device of FIG. 1A, in accordance with an embodiment.

The original shapes of tip body 102, umbrella 103, and wing 104 of customizable ear tip 100 can be obtained during an initial processing step involving in mold curing/cross-linking. The initial processing step involves a reaction between an isocyanate component and a polyol component forming repeating urethane groups in the presence of a chain extender, catalyst, and/or other suitable additives. The cross-linking process that occurs during curing forms a molecule with an infinite molecular weight, resulting in a material with a heightened glass transition temperature. Covalent bonds hold polymer chains together so heat cannot reflow the material. The reaction product has a polymeric backbone having urethane linkages and a particular glass transition temperature ($T_g$). In example embodiments, customizable ear tip 100 can have different glass transition temperatures ($T_g$) for each of tip body 102, umbrella 103, and wing 104. As shown in FIG. 1C, wing 104 may have a high $T_{g1}$ for stability, umbrella 103 may have a low $T_{g2}$ for in-ear comfort, and tip body 102 may have a high $T_{g3}$ for retention of an earpiece 105.

In an exemplary wearable device, at room temperature the original shapes of tip body 102, umbrella 103, and wing 104 are rigid or glassy. At suitable temperatures above $T_{g1}$, $T_{g2}$, and $T_{g3}$, tip body 102, umbrella 103, and wing 104 are more elastic and their geometries can be manipulated. Depending on the specific application, different glass transition temperatures may be appropriate. The polyol or a combination of polyols can be used together to achieve different glass transition temperatures. Glass transition temperatures $T_{g1}$, $T_{g2}$, and $T_{g3}$ are tunable and can be positioned anywhere from room temperature (approximately 20-25 degrees Celsius or 68-77 degrees Fahrenheit) to 65 degrees Celsius or 149 degrees Fahrenheit. Customizable ear tip 100 can be made of a thermoset shape memory polymer having the same glass transition temperature as a single unit or as separate components. Alternatively, customizable ear tip 100 can be made of two or more different thermoset shape memory polymers as described herein having two or more different glass transition temperatures (e.g., $T_{g1}$, $T_{g2}$, and $T_{g3}$).

The polyol component generally provides soft segments of the thermoset shape memory polymer. The polyol component includes one or more polyols that can contain ester and/or ether functionalities along with hydroxyl groups. Any suitable polyols can be used as long as there is crosslinking during the curing process. Polyester polyols include ester and hydroxylic groups. Polyether polyols include ether and hydroxylic groups. The characteristics of the reaction product depend on the molecular weights of the individual materials combined as well as the chain lengths of the materials and the degree of crosslinking. Shorter chain lengths can provide more rigid reaction products while longer chain lengths can provide more flexible reaction products. In example wearable devices, the polyol component includes at least one of the following: (i) a polyether diol, (ii) a multifunctional polyether, and (iii) a multifunctional polyester. The term "multifunctional" as used herein means having more than two functional hydroxyl (OH) groups. A suitable polyether diol is a 425-molecular-weight polypropylene glycol (ARCOL® PPG-425 available from Covestro of Leverkusen, Germany). A suitable multifunctional polyether is a 700-molecular-weight glycerin-initiated polyether triol (CARPOL® GP-700 available from Carpenter Co. of Richmond, Va.). A suitable multifunctional polyester is a 540-molecular-weight polyester triol (CAPA™ 3050 available from Perstorp of Malmö, Sweden).

The isocyanate component generally provides the hard segments of the thermoset shape memory polymer. In example wearable devices, the isocyanate component is an aromatic polymeric diphenylmethane 4,4'-diisocyanate (MDI). In other example wearable devices, the isocyanate component is tolulene diisocyanate (TDI). When the isocyanate component is combined with the polyol component in liquid form, one cyanate group from the isocyanate component (—NCO group) reacts with one hydroxyl group (OH group) from the polyol component. Accordingly, it can be advantageous to have a NCO/OH ratio of 1. Providing the same number of —NCO groups as the number of OH groups helps minimize the amount of residual —NCO groups.

Any suitable additives can be used to control the reaction of the isocyanate component and the polyol component. Additives include catalysts, fillers, defoamers, chain extenders, crosslinkers, and others (e.g., metals, carbon fibers, and nanomaterials for increased thermal conductivity). In example wearable devices, a suitable catalyst can be used to polymerize the mixed isocyanate and polyol components, for example, 1,4-Diazabicyclo[2.2.2]octane (or DABCO). The reaction product can be cured at room temperature and with heat (e.g., approximately 130 degrees Celsius or 266 degrees Fahrenheit). Depending on the catalyst, the curing process can occur quickly or more slowly. It should be appreciated that while any suitable catalyst is contemplated, generally, a slower catalyst is more appropriate for a manual molding process whereas a faster catalyst is more appropriate for an automated molding process. The thermoset shape memory polymers described herein require crosslinking components. In example embodiments, the crosslinking component is included as part of the multifunctional polyether and polyesters described herein or any other suitable component. In alternate embodiments including other polyol components that do not have the crosslinking component, other suitable crosslinking sources can be included, for example, multifunctional amines, thiols, phenolics, and carboxylic acids.

To manipulate the shape of customizable ear tip 100, tip body 102, umbrella 103, and wing 104 can be heated to a suitable temperature that is higher than its one or more glass transition temperatures (e.g., $T_{g1}$, $T_{g2}$, and $T_{g3}$). The glass transition temperatures can be set to temperatures that are close to body temperature, for example, in the range of 38-48 degrees Celsius or 100.4-118.4 degrees Fahrenheit. To achieve these glass transition temperatures, a suitable isocyanate component (e.g., MDI) can be mixed with a polyol component having approximately 0-70% diol and approximately 30-100% multifunctional component. Alternatively, MDI can be mixed with a polyol component having approximately 50-70% diol and approximately 30-50% multifunctional component. Additionally, to achieve these glass transition temperatures, a suitable isocyanate component (e.g., MDI) can be mixed with one or more polyol components. In some embodiments, 100% of the polyol component to be mixed with the isocyanate component is a suitable diol component. In some embodiments, 100% of the polyol component is a suitable multifunctional component. In some embodiments, 50% of the polyol component is a suitable diol component and 50% of the polyol component is a suitable multifunctional component. Any suitable mixture is contemplated. For example, the polyol component can have more of the diol component than the multifunctional component (e.g., >50%) and vice versa. In one example, 70% of the polyol component is a suitable diol component and 30% of the polyol component is a suitable multifunctional component.

Figure 2:
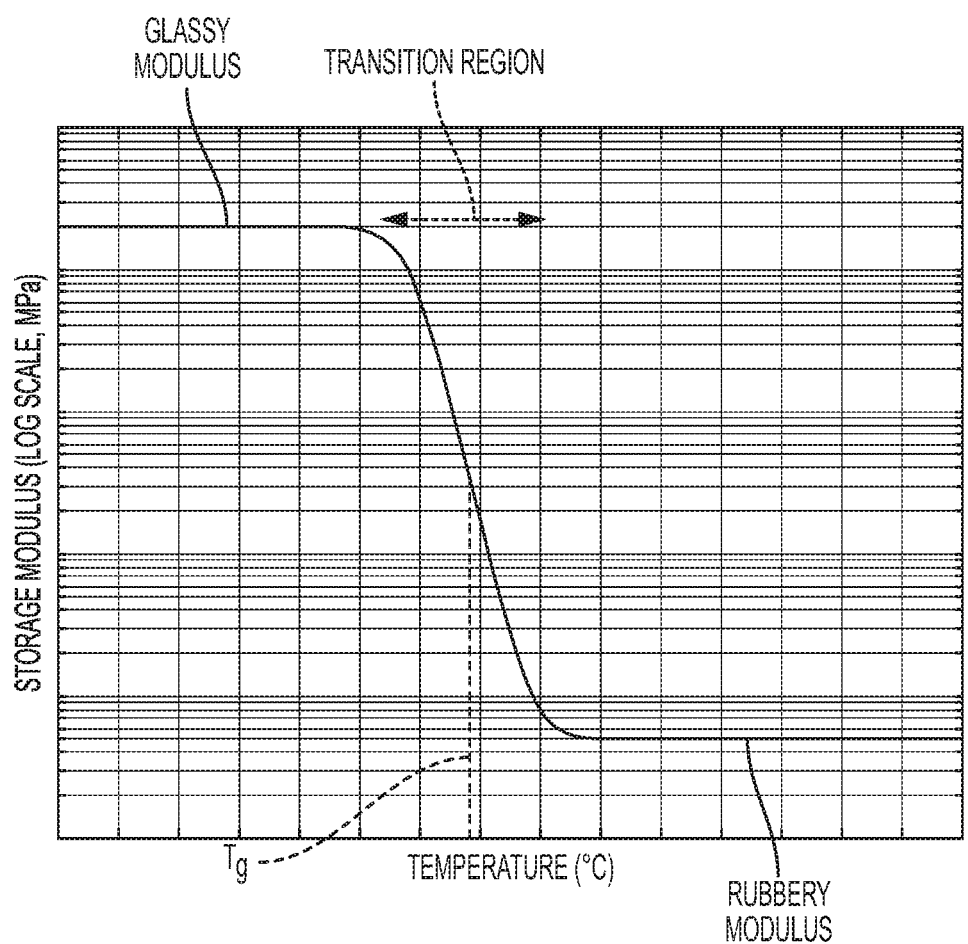
FIG. 2 is a graphical representation of a storage modulus curve for an example shape memory polymer, in accordance with an embodiment.

The viscoelastic properties of the reaction product can be characterized further using dynamic mechanical analysis (DMA). As shown in FIG. 2, a hypothetical storage modulus curve demonstrates the storage modulus (E') of the suitable thermoset shape memory polymers discussed herein as a function of temperature. At low temperatures, the polymers described herein have a glassy modulus (or state) that corresponds to the relatively flat region on the left of FIG. 2 (e.g., E'>200 MPa). The glass transition of the suitable thermoset shape memory polymers begins where the curve begins to slope downward. As temperature rises past the start of the glass transition, the polymers described herein exhibit a sharp decrease in modulus that corresponds to the steep and narrow curve extending between the point defining the beginning of the glass transition region and the point defining the end of the glass transition region. In other words, the polymers described herein transition from a glassy state to a rubbery state quickly (e.g., over <30 degrees Celsius). As temperature rises past the end of the glass transition region, the polymers described herein exhibit a rubbery modulus (or state) that corresponds to the relatively flat region on the right of FIG. 2 (e.g., E'<30 MPa).

Figure 3:
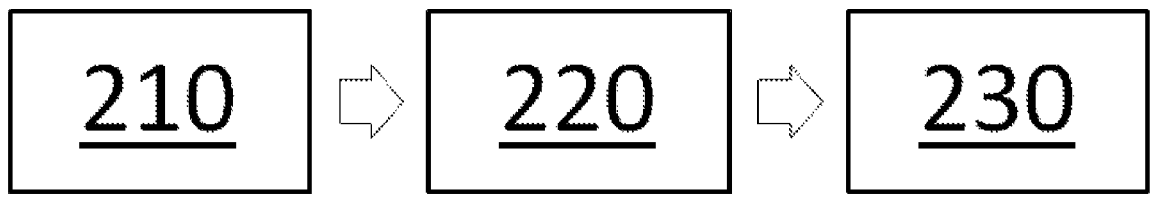
FIG. 3 is a flowchart of an example method of reversibly customizing a wearable device, in accordance with an embodiment.

Any heating element can be used to heat customizable ear tip 100. For example, an external source of heat or an internal source of heat can be provided. Suitable external sources of heat include a heating pad, a light, or warm water. Referring to FIG. 3, after heating customizable ear tip 100 to a temperature that is above the glass transition temperature (i.e., $T>T_g$ where $T_g$ is within the glass transition region discussed above) in step 210, ear tip 100 is conformable (i.e., more elastic). In step 220 a user can position customizable ear tip 100 such that umbrella 103 is within the concha portion and the opening of the ear canal of the ear and wing 104 is under the ear ridge (see FIG. 1B). With customizable ear tip 100 in position, the user can cool customizable ear tip 100 to a temperature that is below the glass transition temperature (i.e., $T<T_g$) in step 230. As the device cools in step 230, customizable ear tip 100 become more rigid or glassy (i.e., less elastic). When cooled, customizable ear tip 100 retains any shape adaptations made while the customizable ear tip was positioned in the user's ear. For example, if wing 104 was bent while in place under the ear ridge, such bend would be maintained after customizable ear tip 100 is cooled to a temperature that is below the glass transition temperature. Below the glass transition temperature, customizable ear tip 100 is in the glassy state and rigid again. To improve comfort, umbrella 103 and wing 104 can be potted (i.e., encapsulated) in a soft coating (e.g., a silicone or polyurethane).

To recover its original shape, customizable ear tip 100 can be subsequently heated to an appropriate temperature that is above the glass transition temperature. Thus, customizable ear tip 100 can be reversibly customized without melting. An additional advantage is that multiple users can share the same wearable device. For example, after a first user customizes a wearable device (e.g., customizable ear tip 100), a second user can customize the same wearable device. To do so, the second user can heat the wearable device such that the wearable device recovers its original shape thereby removing the first user's customized configuration. With the wearable device again in its original shape, the second user can create the second user's customized configuration as described herein.

Figure 4:
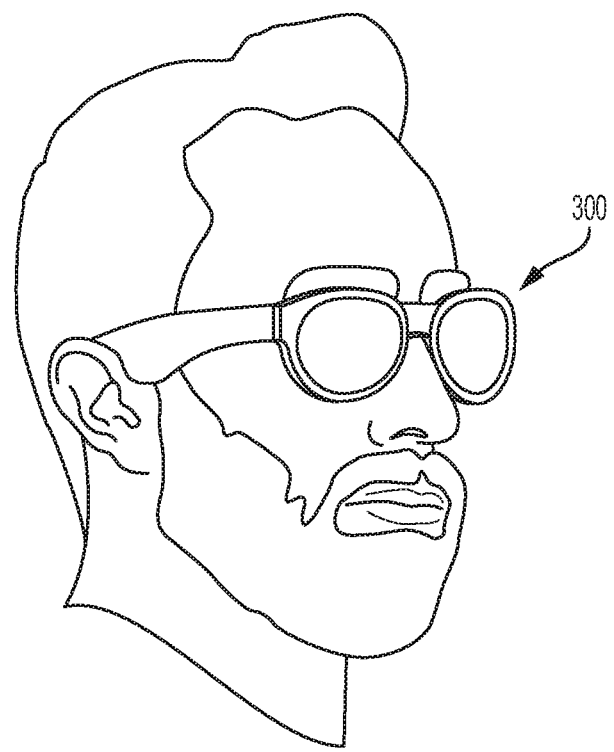
FIG. 4 shows a front perspective view of another example wearable device worn by a user, in accordance with an embodiment.
Figure 5:
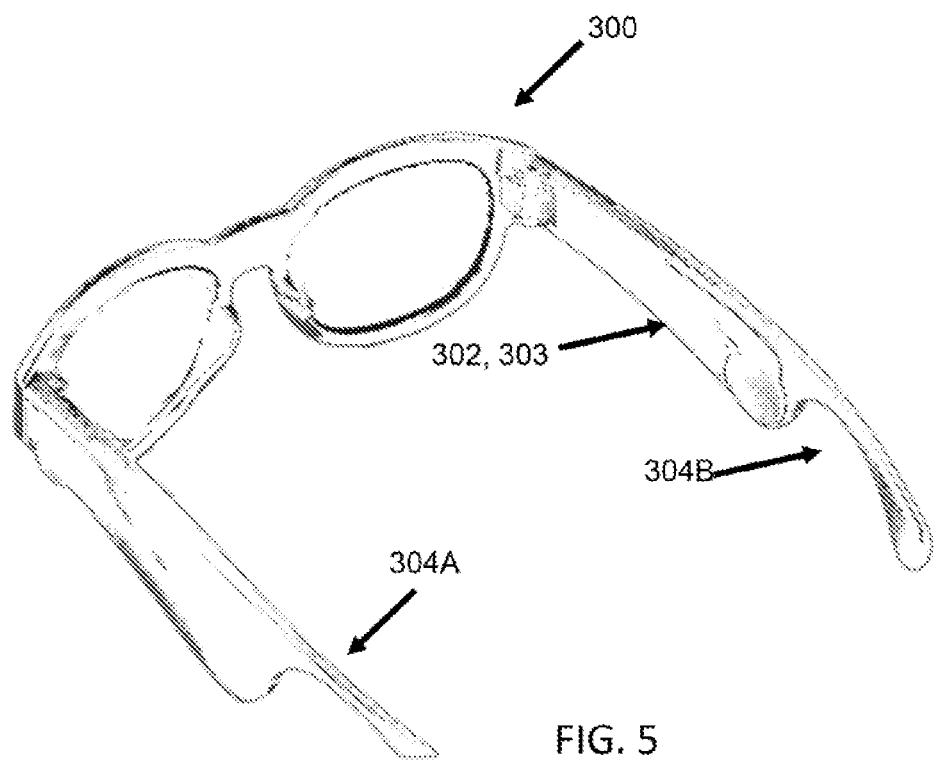
FIG. 5 shows a rear perspective view of the example wearable device of FIG. 4 in isolation, in accordance with an embodiment.

Referring to FIG. 4, a person wearing another example wearable device 300 is shown. FIG. 5 shows a rear perspective view of wearable device 300 shown in FIG. 4. Wearable device 300 is made of the thermoset shape memory polymers discussed herein and any heating element can be used to heat one or more portions of wearable device 300 as discussed above. The glass transition temperature of wearable device 300 can be set to temperatures that are farther from body temperature, for example, in the range of 50-60 degrees Celsius (or 122-140 degrees Fahrenheit). To achieve this glass transition temperature, a suitable isocyanate component (e.g., MDI) can be mixed with a polyol component having approximately 0-30% diol and approximately 70-100% functional component. In example embodiments, to achieve this glass transition temperature, a suitable isocyanate component can be mixed with one or more polyol components. For example, 100% of the polyol component to be mixed with the isocyanate component can be a suitable diol component. In some embodiments, 100% of the polyol component is a suitable multifunctional component. In some embodiments, 50% of the polyol component is a suitable diol component and 50% of the polyol component is a suitable multifunctional component. Any suitable mixture is contemplated. For example, the polyol component can have more of the multifunctional component than the diol component and vice versa. In one example, 70% of the polyol component is a suitable multifunctional component and 30% of the polyol component is a suitable diol component.

In example embodiments, wearable device 300 includes embedded electronic components 302 which can include global positioning sensor (GPS) systems, orientation sensor systems, such as, 3-axis, 6-axis, or 9-axis spatial sensors and can include one or more of a gyroscope, an accelerometer, a magnetometer to provide readings relative to axes of motion of the device and to characterize the orientation and displacement of the device. Other sensors may be utilized either alone or additionally, including but not limited to a pressure sensor (e.g. Hall effect sensor) and other types of sensors, such as a sensor measuring electromagnetic waveforms on a predefined range of wavelengths, a capacitive sensor, a camera, a photocell, a visible light sensor, a near-infrared sensor, a radio wave sensor, and/or one or more other types of sensors. Wearable device 300 can also include a user interface configured to provide information to a user and/or receive information from a user. The user interface can be configured to provide information to the wearer and/or receive information from the wearer via a touch sensitive sensor. For example, the information can be heard. Accordingly, the user interface may be a speaker to provide sounds or words to the user. Many different types of sensors could be utilized. According to one possible embodiment, the sensor or sensors provide complementary information about the position of the device with respect to a user's body part, a fixed point, and/or one or more other positions.

In example embodiments, the entire device is customizable. In alternate embodiments, only certain portions are customizable. In one example, wearable device 300 can be submerged in warm water (e.g., 50 degrees Celsius or 122 degrees Fahrenheit) to heat the thermoset shape memory polymer above its glass transition temperature. In another example, internal resistive heating elements can be actively controlled with battery 303 included in wearable device 300. In another example, internal resistive heating elements can be heated when exposed to a stimulus such as light or current. In embodiments including internal resistive heating elements, one or more conductive additives (or photothermal additives) can be included during the initial processing step involving the reaction between the isocyanate component and the polyol component to facilitate thermal conductivity through the material. Additives that are suitable to facilitate thermal conductivity include but are not limited to suitable carbon-containing species, such as graphene, carbon black, carbon nanofibers, carbon nanotubes, etc.

As wearable device 300 is heated to a temperature that is above its glass transition temperature (i.e., $T>T_g$), wearable device becomes less rigid and more elastic. Once wearable device 300 is conformable in the heated state, a wearer can position the device 300 on his or her face so that the device can adopt a new configuration having greater conformity to the wearer's facial features. For example, temple tips 304A and 304B can adopt configurations to match the skin surfaces above and behind the user's ears for improved comfort and stability. With wearable device 300 in position in the new configuration, the user can allow the device to cool to a temperature that is below the glass transition temperature (i.e., $T<T_g$) so the device transitions to the glassy state maintaining the new custom configuration. If a new user desires to customize wearable device 300, he or she can heat the device above its glass transition temperature and the temple tips 304A and 304B along with any other manipulated portions will transition back to their original shapes. Once in their original shapes, the new user can modify wearable device 300 to adapt to his or her anatomical features and then cool wearable device 300 to transition to the glassy state to lock in the newly modified wearable device 300.

In example embodiments including embedded conductive elements, these same conductive elements can serve as various electrode sensors to pick up biosignals. Suitable electrode sensors include physiological electrodes for measuring various biopotentials for a variety of applications including electrocardiography (ECG), electromyogram (EMG), electrooculogram (EOG), and electroencephalogram (EEG). The physiological electrodes make use of the natural pressure provided by the customized wearable device to hold the sensors securely in place at positions on the body. In example embodiments, these positions are inside the ear, on the temples, and/or on the *glabella* (i.e., the portion of the body between the eyebrows). The electrode sensors include a first surface in contact with the skin and a second surface connected to other components for amplifying, filtering, processing, recording, and/or transmitting acquired signals. In example embodiments, the electrodes and their electrical connections are integrated into the customizable wearable device.

Figure 6:
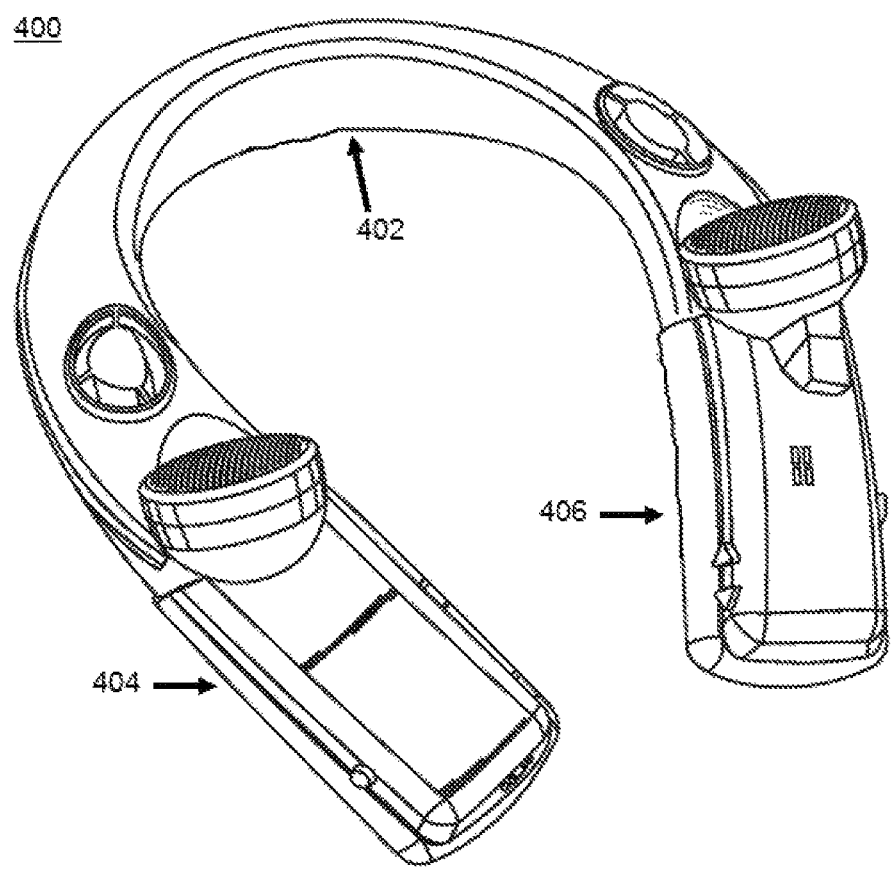
FIG. 6 shows a front perspective view of another example wearable device, in accordance with an embodiment.

Referring to FIG. 6, an example acoustic device 400 that can be reversibly customized as described herein is shown. In this example, the SoundWear™ speaker from Bose Corporation of Framingham, Mass. is used. Acoustic device 400 includes a generally "U"-shaped neck loop configured to be worn around the neck of a person. The neck loop of acoustic device 400 includes a curved central portion 402 that is configured to sit at the nape of the neck, and right and left legs 404 and 406, respectively, that descend from central portion 402 and are configured to drape over the upper torso on either side of the neck, generally over or near the clavicle. Legs 404 and 406 can be configured with acoustic drivers and sound outlet openings to produce sound directed upward toward the ears of the person wearing acoustic device 400. In its standard configuration, acoustic device 400 includes steel wire encased in medical-grade silicone and the neck loop may be expanded, straightened, or re-shaped in a manner more suitable to the shape and size of the user. The standard configuration of the neck loop may be covered in a soft fabric material for improved comfort. In the example of FIG. 6, the "U"-shaped neck loop is made of or at least partially made of the thermoset shape memory polymers described herein and does not require the steel wire encased in silicone or the soft fabric material. In example embodiments, at least parts of acoustic device 400 that contact the body (e.g., the nape of the neck, the collar bone, the spine, and the trapezius muscles) can be made of or at least partially made of the thermoset shape memory polymers described herein so that at least these portions can be reversibly customized to match a user's anatomy. In this way, at least these parts that contact the body can be reversibly customized to the particular shape of the user's body to provide a more comfortable and stable fit. In example embodiments, the entire "U"-shaped neck loop is made of the thermoset shape memory polymers as described herein.

Figure 7:
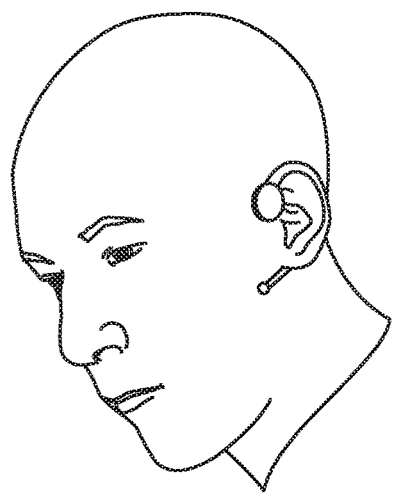
FIG. 7 shows a perspective view of another example wearable device worn by a user, in accordance with an embodiment.
Figure 8:
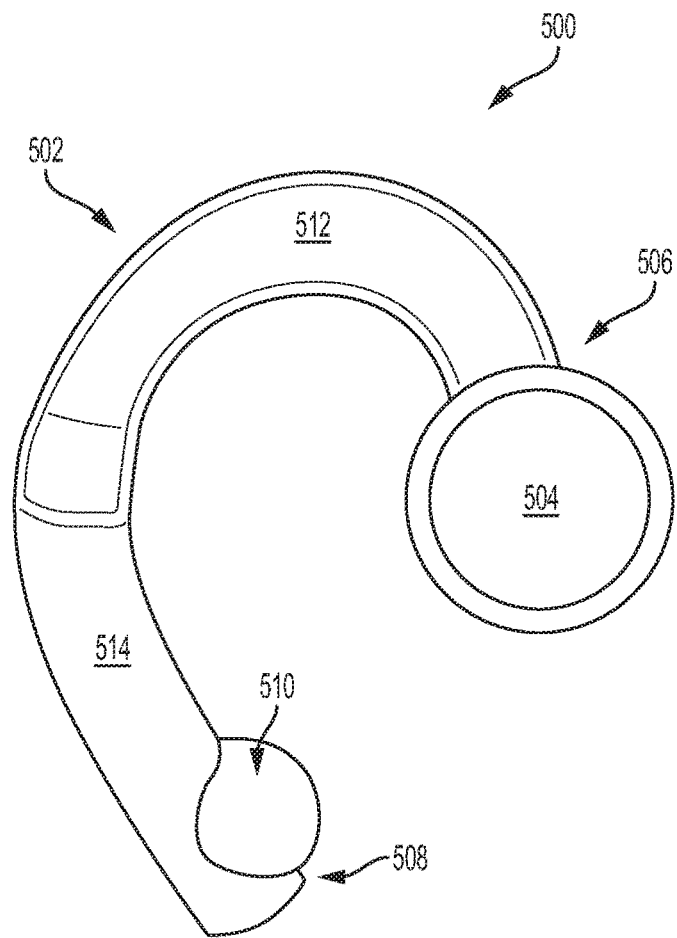
FIG. 8 shows an elevational perspective view of the example wearable device of FIG. 7 in isolation, in accordance with an embodiment.

Another example wearable acoustic device 500 that can be reversibly customized is depicted in FIGS. 7 and 8. In FIG. 7, around-the-ear speaker 500 is shown being worn by a person. Around-the-ear speaker 500 is shown in FIG. 8 in isolation. The following should be viewed in light of FIGS. 7 and 8. Speaker 500 includes hook-shaped curved body 502 and speaker 504. Hook-shaped curved body 502 is shaped to surround rear parts of an ear of a user. First end 506 of hook-shaped curved body 502 is connected to speaker 504 and second end 508 that is opposite first end 506 includes protrusion 510. Hook-shaped curved body 502 also includes first portion 512 and second portion 514 between first and second ends 506 and 508. First portion 512 is more arcuate and thinner than second portion 514. In this way, first portion 512 is shaped to follow the natural curvature of the back of the ear and to prevent speaker 500 from inadvertently falling off. First portion 512 is thinner than second portion 514 in part because the space between the ear and the head is smaller at the top of the ear than behind the ear. Speaker 504, positioned near a temple of a wearer when worn, can include an acoustic driver for transducing received audio signals to acoustic energy and a sound outlet opening to produce sound directed downward toward the ear canal of the person. While hook-shaped curved body 502 is positioned behind the ear, speaker 504 is positioned in front of the ear such that a sound outlet opening has a direct (i.e., unobstructed) path to the ear canal of the wearer. Hook-shaped curved body 502 can be made of or at least partially made of the thermoset shape memory polymers described herein. In example embodiments, at least parts of hook-shaped curved body 502 that contact the body (e.g., first portion 512 and/or second portion 514) can be made of or at least partially made of the thermoset shape memory polymers described herein so that at least these parts can be reversibly customized to better match a user's auricular anatomy. In this way, at least these parts that contact the back of the ear can be reversibly customized to the particular shape of the user's body to provide a more comfortable and stable fit. In example embodiments, the entire hook-shaped curved body is made of the thermoset shape memory polymers as described herein.

The wearable devices described herein can also be made of other materials to provide improved comfort, stability and overall wearability. Although any suitable soft material is contemplated, one suitable material is compounded polynorbornene (Norsorex® material available from D-NOV GmbH of Vienna, Austria, product number M040822-15). Polynorbornene is a hydrocarbon-based material containing carbon-carbon double bonds in the polymer backbone (i.e., unsaturation). The "unsaturation" refers to the presence of at least one carbon-carbon double bond or carbon-carbon triple bond. Polynorbornene exhibits high performance in acoustic, passive attenuation, and comfort metrics and a glass transition temperature around 37-38 degrees Celsius, which provides good damping properties and properties for reversible customization. Accordingly, implementations may include a reversibly customizable wearable device including a body having one or more embedded electronic components and an elastic material having a glass transition temperature and a polymeric backbone where a portion of the polymeric backbone is unsaturated (e.g., polynorbornene or a polynorbornene-based material including any suitable additives to alter the properties of the material). At a first temperature that is lower than the glass transition temperature, the body has an original shape. When the body is heated to a second temperature that is higher than the glass transition temperature, the body is deformable from the original shape to a first shape and when the body is cooled to a third temperature that is lower than the glass transition temperature, the first shape is maintained. The body is configured to transition from the first shape to the original shape when the body is heated from the third temperature to a fourth temperature that is higher than the glass transition temperature.

While several inventive examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive examples described herein. It is, therefore, to be understood that the foregoing examples are presented by way of example only and that, within the scope of the appended claims and equivalents thereto, inventive examples may be practiced otherwise than as specifically described and claimed. Inventive examples of the present disclosure are directed to each individual feature, system, article, material, and/or method described herein. In addition, any combination of two or more such features, systems, articles, materials, and/or methods, if such features, systems, articles, materials, and/or methods are not mutually inconsistent, is included within the inventive scope of the present disclosure.

What is claimed is:

1. A wearable device, comprising:
   a body comprising one or more embedded electronic components, the body comprising a thermoset material having a polymeric backbone comprising at least one urethane linkage, the thermoset material having a glass transition temperature, wherein at a first temperature that is lower than the glass transition temperature, the body has an original shape;
   wherein when the body is heated to a second temperature that is higher than the glass transition temperature, the body is deformable from the original shape to a first shape and when the body is cooled to a third temperature that is lower than the glass transition temperature, the first shape is maintained; and
   wherein the body is configured to transition from the first shape to the original shape when the body is heated from the third temperature to a fourth temperature that is higher than the glass transition temperature.

2. The wearable device of claim 1, wherein the thermoset material comprises a reaction product of a polyol component, an isocyanate component, a crosslinker, and a catalyst to polymerize the isocyanate and polyol components.

3. The wearable device of claim 2, wherein the thermoset material further comprises a conductive or photothermal additive and a resistive heating element configured to heat the body to the second and fourth temperatures that are above the glass transition temperature.

4. The wearable device of claim 1, wherein the one or more embedded electronic components comprise an electrode sensor to pick up biosignals.

5. The wearable device of claim 1, wherein the body is heated with a heating pad, light, or water.

6. The wearable device of claim 2, wherein the polyol component comprises a multifunctional polyether and a polyether diol or a multifunctional polyester and a polyether diol.

7. The wearable device of claim 1, wherein the glass transition temperature is above body temperature.

8. A wearable device, comprising:
   a body comprising one or more embedded electronic components, the body comprising a thermoset material containing a reaction product of a polyol component and an isocyanate component, the thermoset material having a glass transition temperature, wherein at a first temperature that is lower than the glass transition temperature, the body has an original shape;
   wherein when the body is heated to a second temperature that is higher than the glass transition temperature, the body is deformable from the original shape to a first shape and when the body is cooled to a third temperature that is lower than the glass transition temperature, the first shape is maintained; and
   wherein the body is configured to transition from the first shape to the original shape when the body is heated from the third temperature to a fourth temperature that is higher than the glass transition temperature.

9. The wearable device of claim 8, wherein the polyol component consists of a multifunctional polyether.

10. The wearable device of claim 8, wherein the polyol component comprises a multifunctional polyether and a polyether diol.

11. The wearable device of claim 10, wherein the polyol component comprises 50% of the polyether diol and 50% of the multifunctional polyether.

12. The wearable device of claim 10, wherein the polyol component comprises more of the multifunctional polyether than the polyether diol.

13. The wearable device of claim 8, wherein the polyol component comprises a multifunctional polyester and a polyether diol.

14. The wearable device of claim 13, wherein the polyol component comprises more of the multifunctional polyester than the polyether diol.

15. The wearable device of claim 8, wherein the one or more embedded electronic components comprise an electrode sensor to pick up biosignals.

16. The wearable device of claim 15, further comprising a resistive heating element configured to heat the body to the second and fourth temperatures that are above the glass transition temperature.

17. The wearable device of claim 8, wherein the glass transition temperature is above body temperature.

18. An earpiece, comprising:
   an acoustic driver for transducing received audio signals to acoustic energy;
   a body comprising a thermoset material containing a reaction product of a polyol component and an isocyanate component, the thermoset material having a glass transition temperature that is above body temperature, wherein at a first temperature that is lower than the glass transition temperature, the body has an original shape;
   wherein when the body is heated to a second temperature that is higher than the glass transition temperature, the body is deformable from the original shape to a first shape and when the body is cooled to a third temperature that is lower than the glass transition temperature, the first shape is maintained; and
   wherein the body is configured to transition from the first shape to the original shape when the body is heated from the third temperature to a fourth temperature that is higher than the glass transition temperature.

19. The earpiece of claim 18, wherein the earpiece is an in-ear earpiece configured to fit inside a user's ear.

20. The earpiece of claim 18, wherein the earpiece is an around-the-ear earpiece configured to be positioned on a user's ear.

* * * * *